Figure 1:
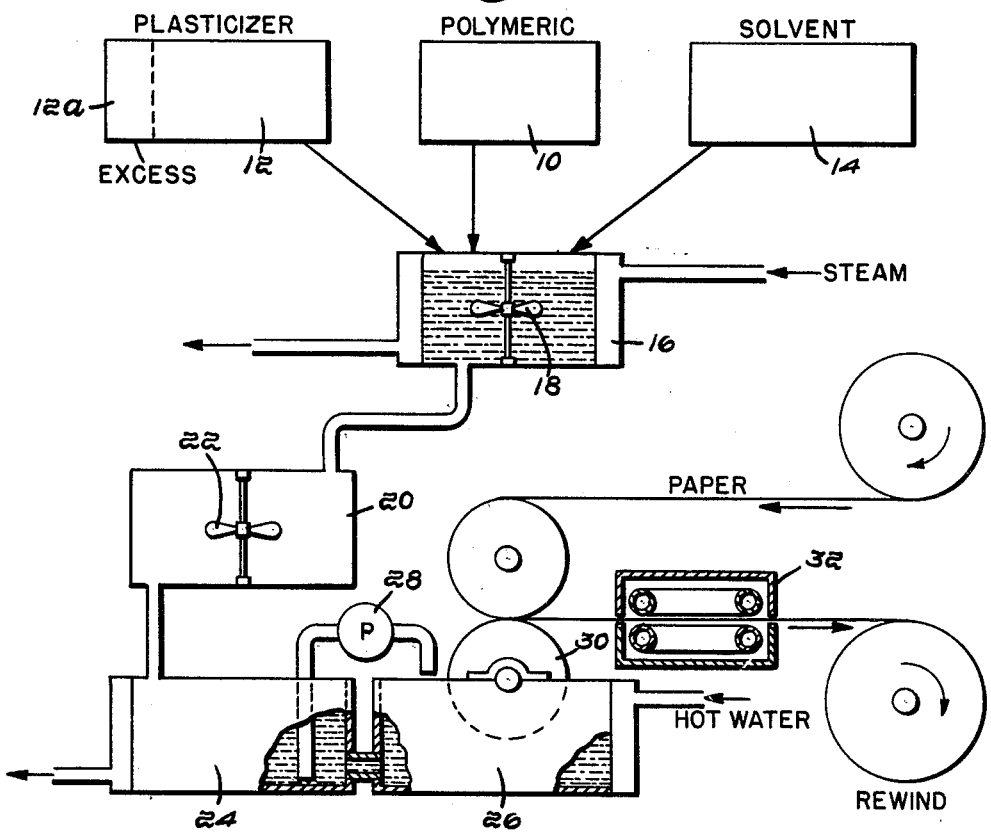

Inventors:
William D. Cochrane,
George W. Wright,
by Emery, Booth, Miller & Townsend Attys

United States Patent Office 3,154,428
Patented Oct. 27, 1964

3,154,428
MANUFACTURE OF DOUBLE PHASE
ADHESIVE FILMS
William D. Cochrane, Chelmsford, and George W. Wright, Wellesley Hills, Mass., assignors to Nashua Corporation, Nashua, N.H., a corporation of Delaware
Filed July 21, 1960, Ser. No. 44,388
1 Claim. (Cl. 117—122)

This invention relates to the manufacture of thermosensitive adhesive films of the double phase type described in United States Patent 2,462,029 to Perry, and the object is to provide an advantageous method for preparing one sub-type of such double phase films.

Figure 2:
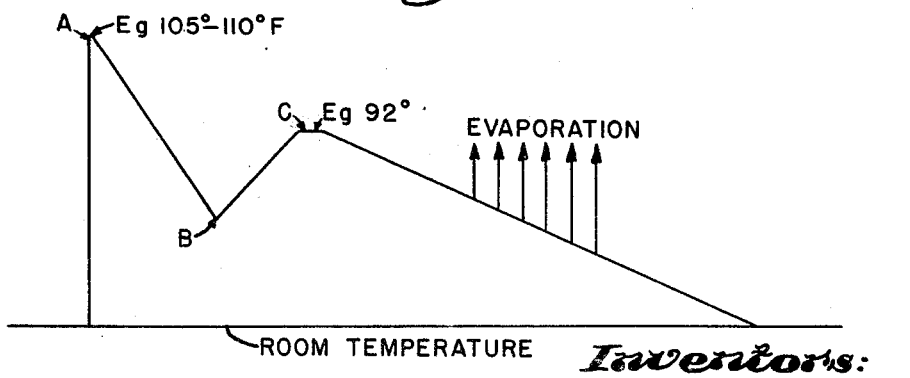

The invention will be well understood by reference to the following description thereof, taken in connection with the accompanying drawing which diagrammatically discloses the manipulations of the process. This drawing is quite unrealistic and probably will be of use chiefly as a sort of graphical memorandum of the subject matter for the convenience of those who may have occasion hereafter to make use of the patent. In the drawing:

FIG. 1 is a diagram of the steps utilized in one illustrative example of the process and of the apparatus used; and FIG. 2 is a diagram illustrating (not to scale) the variations of temperature during the process.

The Perry patent above referred to describes an adhesive in the form of a film, normally solid and megascopically homogeneous, which is non-tacky at room temperature but activatable to adhesiveness by heat, and wherein the temperature at which it exhibits incipient tackiness (which might cause blocking or premature sticking of one coated sheet to another or to an external object) is relatively high. An amorphous potentially viscid polymeric material which exhibited a high incipient tackiness would in general become usefully adhesive only at an inconveniently high temperature.

Perry therefore provided a film containing such an amorphous polymeric ingredient and also a potential plasticizer of a generally crystalline character for such amorphous material which was present in solid form and mechanically admixed with the polymeric material. This was the first phase of the film. On heating the ingredients became fluid and merged. In a sense the result was a new, plasticized material, adhesive at a relatively low temperature, and retaining this character for an extended period of time after substantial cooling. This was the second phase. In fact the second phase film might remain usefully adhesive when cooled to room temperature, and be used as a pressure-sensitive adhesive. This was then a case where the temperature of useful adhesiveness of the film in its second stage was lower than the temperature of initial tackiness of the first stage.

Many films so compounded, although amorphous (as indicated by substantial translucency) and more or less viscid when cooled become on prolonged standing opaque and hard, indicating reappearance of crystalline material therein. This may be explained by saying that the film when first cooled existed in a supercooled or supersaturated state, the polymeric constituent containing merged therewith an excess of crystalline material beyond what would be normally compatible therewith at room temperature. This excess may crystallize out eventually, leaving the polymeric material no longer supersaturated but in a saturated form, the recrystallized excess then mechanically admixed with the plasticized polymer.

While such a film, after recrystallization of the excess, would not be a precise reconstitution of the first phase as above described, it may in suitable formulations have quite a high temperature of incipient tackiness and, after activation a desirably low temperature of useful adhesiveness, the film reverting to and retaining for a substantial length of time its supercooled state. It would thus be a double phase adhesive film exemplifying the Perry invention and would be duplicated if there were used in its manufacture the same polymeric material originally softened or plasticized to the limit of its compatibility with the plasticizer at normal temperatures (and in a sense equivalent to an unplasticized material of similar properties as regards its physical state at different temperatures) and a substantially crystalline plasticizer mechanically admixed therewith, this crystalline plasticizer being excess as above referred to.

In general if we form a fluid mix of coatable consistency from polymeric material and a compatible normally solid plasticizer in excess either by melting them together or by dissolving them in a common solvent, and coat the fluid mix on paper in the form of a film, it supercools as a tacky coating. Various methods have been proposed for treating such a film to break the supercooled condition and promote recrystallization of the excess plasticizer without undue delay. Our invention sharply distinguishes from such processes as hitherto proposed, and our process is characterized by the formation of a coatable fluid mix in solution form containing a small portion of the crystalline plasticizer in the form of very small seed crystals uniformly distributed throughout the volume, wherein they appear as a turbidity, and coating a film in this state on the paper. Then on evaporation of the solvents (with or without additional cooling) recrystallization of the excess by proliferation of crystals from these seeds or nuclei proceeds rapidly within the gradually solidifying film throughout its volume and the coated paper may be rewound as promptly as any other paper coated from a solution without danger of blocking. Before describing the process of the invention in detail some consideration of the phenomenon of solution may facilitate the understanding of what takes place.

When we speak of dissolving a solid material in a liquid solvent to form under the conditions of use a fluent homogeneous mixture we may make a more precise statement by saying that a certain weight of the solute will dissolve in a certain volume or weight of the solvent under like conditions to form a solution of a certain standard, for instance a saturated solution. If more of a second solute dissolves in the same solvent under like conditions, we say the second is more readily soluble than the first. If one solvent liquid dissolves more of a given solute than another solvent liquid, we say that the former has greater solvent power for that solute.

While it is not a universal rule, in general increase in temperature will increase the amount of solute which passes into solution in a given time. For any given solute and any given solvent we can plot a curve which will indicate the amount of solute which will be dissolved in a given quantity of solvent at various temperatures. The curve will not in general be linear. The curve will be different for different solutes in a given solvent, and for the same solute in different solvents. This curve may be taken to represent the "solvent capacity" of a solvent, whether a single material or a mixture, with respect to a particular solute.

In accordance with our invention we utilize a solvent having distinctively different solvent capacities for the polymeric material and crystalline plasticizer material respectively within an appropriate range, and by manipulation of temperature are enabled to obviate the formation of a supercooled mixture of the film applied to the paper and, on the contrary, develop the crystallization of the excess of plasticizer within the film in the form of very fine crystals intimately admixed with the film in substantially uniform proportions at different levels of its thickness.

Our process is characterized by dissolving the polymeric material and the compatible plasticizer (in excess) in a common solvent having different solvent capacities with respect to the polymeric material and plasticizer respectively and manipulating the temperature of this fluid to initiate the formation of crystals of the plasticizer (then checking proliferation of the crystals if necessary) then coating the mixture (which will be slightly turbid) as a film and as a result of temperature changes incident to the formation and solidification of the film cause within the film crystallization of the excess of plasticizer by proliferation in the still mobile but gradually solidifying film from the seed crystals provided by the second mentioned step. Supercooling of the film is obviated. These crystals are small rapidly formed crystals of substantially perfect form as contrasted with fractured fragments produced by grinding the plasticizer and mechanically admixing the particles as a suspended phase in the polymeric material. Crystals at the surface of the film imperfectly adhered thereto and subject to loss by dusting are not present in any significant degree because of the generation of the crystals internally of the mass.

The possibility of using a single solvent having the requisite differential solubility capacity is not excluded. It is convenient commercially to use a mixed solvent which may be tailored to a particular formulation of ingredients with which it is to be used. The mixed solvent may include one component having good solubility capacity (although not necessarily equal) for both the polymeric material and the plasticizer, while the other component is a rather poor solvent for the plasticizer as compared with its capacity as a solvent for the polymeric material. For the former ingredient toluol is attractive commercially because of its low price and ready availability. The other ingredient, which may be mixed with toluol in varying proportions, may be one of the commercial products which are mixtures of low boiling aliphatic hydrocarbons. Its evaporation rate may be either greater or less than that of the toluol, as will appear from some of the examples given. This is mentioned here to point out that the phenomenon involved in the process is not one wherein two solutes are dissolved in a mixed solvent and one of the solutes is relatively more soluble in the more readily evaporated component of the solvent. In that case, on evaporation, as the better solvent evaporates the said one solute remains in an environment that is less hospitable thereto and tends to precipitate.

A sequence of steps such as may be utilized in the process of the invention will next be described in a somewhat general way in connection with the diagrammatic figures of the drawing, and thereafter specific examples of materials used and their proportions will be given. In the examples parts are stated as parts by weight, and they represent ratios which may be modified by any suitable multiplier in operations of actual practice. Temperatures are stated in Fahrenheit degrees and are subject to a variance of a degree or so either way. "Room temperature" is taken as 70° F. A "film" means a coating such as is usually applied on heat seal paper, usually a mil or only a little more thick.

In the diagram, FIG. 1, the two rectangles 10 and 12 at the top of the sheet indicate respectively the amorphous polymeric material and the plasticizer which are to be mixed, and it will be noted that the left-hand rectangle representing the plasticizer is larger than that representing the amorphous material and that a certain portion, 12a, of its area is ruled off and marked "excess." This does not mean that equal weights or volumes of amorphous material and plasticizer would necessarily be compatible, but is merely a diagrammatic indication of the use of an excess amount of solid plasticizer in the sense already described. The rectangle 14 at the right indicates the solvent. Suitable proportions of these three are supplied to the steam jacketed kettle 16 and heated to an elevated temperature, which usually will be around 105–110°, under agitation, as indicated by the diagrammatic showing of the rotary impeller 18, until solution of hte solid is effected. The solution at this time will be a clear mobile liquid.

The temperature of the solution is then reduced to provide an initial stage of crystallization of the excess plasticizer. I have herein indicated the liquid solution as being drawn out into another vessel 20 where, under constant stirring, as by the impeller 22, the temperature is reduced until an initial stage of crystallization is reached which, for example, as in the case of Example 1 referred to below may be about 82°.

We have been accustomed to call this temperature the "nucleation temperature," which is not a scientifically definite definition, although, as will appear, crystals are present in the mix which could form nuclei for further crystallization. While still fluid the mix becomes more or less opaque, due to suspended precipitated matter and assumes a recognizable color tone of a yellowish buff. The bottom of the container cannot be observed from the surface as it could be through the clear solution. We cannot accurately state the amount of plasticizer which occurs in solid form at this stage, but make a reasonable estimate that it is less than 1% of the excess. When a suitable point has been chosen by more or less subjective judgment and is confirmed as a desirable one for practical use, the actual temperature measurement may be used as a guide in practice for attaining the desired temperature.

While the material in container 20 at the nucleation temperature is a fluid, if it is directly coated on the paper as a film and the film solidified by evaporation of the solvent, the product will be somewhat "rough" or "lumpy." These words probably suggest to a casual reader a dimension much larger than any which is actually observed, but it appears that probably the crystals at this stage tend to lump together, and/or when serving as focal points for proliferation in the later stages of the process, cause the accumulating crystals to agglomerate in relatively large masses, as distinct from the ideal (which may be closely approximated in practice) of having substantially single seed crystals of substantially perfect form dispersed throughout the mix and characteristically propagating in files or lines.

Therefore, after the nucleation temperature is attained the mix is warmed by about ten degrees. Presumably some of the crystals are redissolved, but the liquid remains cloudy or turbid, indicating the presence of very small dispersed particles which cannot be observed individually with the naked eye. We surmise that the order of magnitude may be as low as one micron long. Herein this reduction of temperature is effected in a container 24, which is in communication with a pan 26 of a coater (herein diagrammed as a simple form of roller coater) and a circulation between the two compartments is effected to keep the material agitated as diagrammed by the pump 28. The temperature of the mix at the stage which in many instances, as indicated by the examples to be given, is substantially higher than room temperature, may be maintained by hot water heating of these containers, as shown in the diagram. The turbid fluid is then coated by coater roll 30 on the paper to provide a film a mil or so in thickness, and proceeds toward the right in the figure. A film of this nature has enormous area relative to its volume, and immediately begins to radiate heat. The solvent starts to evaporate, which has a cooling effect. The evaporation may take place naturally if the paper is supported for a sufficient distance or it may be expedited by blowing warm air over the surface of the paper or applying heat thereto, as indicated by the showing of a drying oven 32. As the mixture cools during the initial stages of evaporation of the solvent, crystallization in the still mobile film proceeds rapidly from the seed crystals the presence of which in the mixture was manifested by the cloudiness.

The tiny seed crystals occur at all points in the film and the colonies which they propagate are similarly distributed in the film as it sets and they are finally entrapped in the solidified film, which may be rewound as indicated at the right of the figure, with no danger of blocking.

FIG. 2 is a diagram, not to scale, showing the variations of temperature. At the point A we have the formation of the clear liquid solution in the container 16. Cooling of the liquid to the point B, corresponding to the nucleation temperature, is at the location 20 in FIG. 1. The point C is the coating temperature of the mix. After coating the temperature falls as the result of heat radiation and of evaporation which is indicated by the arrows. The finished product is delivered and rewound at room temperature.

The following examples are illustrative of the invention, and show some of the variations in the materials and proportions which may be used.

Example 1

Polymeric:
Acryloid B-82 _____ 26.4
Nevindine R-5 _____ 10
Dylene 3P5 _____ 11.6
                                        ――――
                                         48

Plasticizer: Diphenyl phthalate _____ 112
Solvent:
Toluol _____ 140
Textile spirits _____ 60

Acryloid B-82 is the commercial name for acrylic copolymer resin.

Nevindine R-5 is the commercial name for a coumarone indene resin.

Dylene 3P5 is the commercial name for a polystyrene resin.

Textile Spirits is a commercial name for a water white aliphatic naphtha having a Kauri Butanol value of 32.8, a boiling range of 145–170° F. and a specific gravity of 0.7005. Its evaporation time is three minutes for a given volume as contrasted with 8.0 minutes for toluol.

The "nucleation temperature" is 71° and the coating temperature (turbid liquid) 83°.

Example 2

This shows a different polymeric ingredient. For the Acryloid in Example 1 is substituted Pliolite S-5B, a styrene-butadiene copolymer containing 85 percent styrene and 15 percent butadiene. The temperature values are substantially the same as in Example 1.

Example 3

The coumarone indene resin of Example 2 is replaced by Krumbhaar #1717, a hydrogenated phenol formaldehyde resin. The temperature values are substantially the same as in Example 1.

Example 4

This shows a different plasticizer. Toluene sulphonamide is substituted for diphenyl phthalate in the formula of Example 1. The temperature values are substantially the same as in Example 1.

Example 5

The same solids are used as in Example 1, but 150 parts of toluol and 50 parts of Textile Spirits are used to make up the solvent. The nucleation temperature is substantially 62°, below nominal room temperature and the coating may be effected at about 72° to 75°, which may be actual room temperature in the coating room.

We are aware that the invention may be embodied in other specific forms without departing from the spirit or essential attributes thereof, and we therefore desire the present embodiment to be considered in all respects as illustrative and not restrictive, as is in fact clear in several matters from the description itself. Reference is to be had to the appended claims to indicate those principles of the invention exemplified by the particular embodiment described and which we desire to secure by Letters Patent.

We claim:

In the manufacture of normally solid, non-tacky, megascopically homogeneous adhesive films of the double phase type which comprise an amorphous, polymeric ingredient which becomes viscid and adhesive when heated and normally solid, crystalline plasticizer therefor, which plasticizer is compatible with the polymeric material and is present in excess of the amount normally compatible therewith at room temperature, which excess is admixed in solid form with the polymeric material and will merge with the polymeric material on heating, and on subsequent cooling to a lower temperature remain merged therewith in a supercooled state for a substantial length of time, the method which comprises, first, forming a clear fluent solution of said polymeric material and plasticizer in a liquid solvent having different solvent capacity relative to the polymeric material and plasticizer respectively, second, cooling the solution to effect crystallization of a small portion of the plasticizer throughout the fluent mass, raising the temperature to inhibit further growth of crystals and agglomeration of those already formed without completely redissolving said portion and, third, coating the resultant fluent mixture as a film on a carrier and evaporating the solvent with concurrent cooling of the film to permit proliferation from the seeds or foci therein of crystals of said excess of plasticizer substantially uniformly throughout the mass of the film to be entrapped within the ultimately solidified polymeric material.

References Cited in the file of this patent

UNITED STATES PATENTS 2,462,029    Perry _____ Feb. 15, 1949

FOREIGN PATENTS 553,961    Canada _____ Mar. 4, 1958